United States Patent
Lorenz et al.

(10) Patent No.: US 9,452,725 B2
(45) Date of Patent: Sep. 27, 2016

(54) OCCUPANT PROTECTION DEVICE FOR A VEHICLE

(71) Applicant: Audi AG, Ingolstadt (DE)

(72) Inventors: Stephan Lorenz, München (DE); Ingo Schütz, Erdweg (DE); Ulrich Pfeiffer, Karlskron (DE); Werner Wilding, Walting (DE); Alwin Tuschkan, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/671,612

(22) Filed: Mar. 27, 2015

(65) Prior Publication Data

US 2015/0274106 A1    Oct. 1, 2015

(30) Foreign Application Priority Data

Mar. 28, 2014 (DE) .................. 10 2014 004 570

(51) Int. Cl.
*B60R 21/01*    (2006.01)
*B62D 1/16*     (2006.01)
(Continued)

(52) U.S. Cl.
CPC ........... *B60R 21/01* (2013.01); *B60R 21/0134* (2013.01); *B60R 21/01512* (2014.10); *B60R 21/01538* (2014.10); *B60R 21/01564* (2014.10); *B60R 21/203* (2013.01); *B60R 21/231* (2013.01); *B62D 1/16* (2013.01); *B60R 2021/01013* (2013.01); *B60R 2021/01231* (2013.01); *B60R 2021/01252* (2013.01); *B60R 2021/0273* (2013.01); *B60R 2021/161* (2013.01)

(58) Field of Classification Search
CPC ................ B60R 21/01; B60R 21/231; B60R 21/01564; B60R 21/01512; B60R 21/0134; B60R 1/16; B60R 21/203; B60R 21/01538; B60R 2021/01252; B60R 2021/161; B60R 2021/01013; B60R 2021/01231; B60R 2021/0273
See application file for complete search history.

(56) References Cited

U.S. PATENT DOCUMENTS 5,507,521 A * 4/1996 Steffens, Jr. .......... B60R 21/203
                                                       180/282
6,264,235 B1    7/2001 Battermann et al.
(Continued)

FOREIGN PATENT DOCUMENTS

DE    197 14 898    10/1998
DE    201 05 002     8/2001
(Continued)

OTHER PUBLICATIONS

European Search Report issued on Aug. 12, 2015 with respect to counterpart Chinese patent application EP 15 00 0549.
(Continued)

*Primary Examiner* — Drew Brown
(74) *Attorney, Agent, or Firm* — Henry M. Feiereisen LLC

(57) ABSTRACT

An occupant protection device for a vehicle includes an airbag module arranged in a hub region of a vehicle steering wheel used for steering vehicle wheels about a steering angle when the steering wheel is turned to a rotary position. The airbag module has an airbag configured for deployment between a driver and the steering wheel in the event of a crash. An adjustment unit is provided to turn the steering wheel from the rotary position to a crash position while the steering angle of the vehicle wheels remains unchanged so as to align the airbag with a posture of the driver in the event of a crash.

26 Claims, 5 Drawing Sheets

(51) Int. Cl.
  *B60R 21/203* (2006.01)
  *B60R 21/015* (2006.01)
  *B60R 21/0134* (2006.01)
  *B60R 21/231* (2011.01)
  *B60R 21/02* (2006.01)
  *B60R 21/16* (2006.01)

(56) References Cited

U.S. PATENT DOCUMENTS

| | | |
|---|---|---|
| 6,959,944 B2 | 11/2005 | Mori et al. |
| 8,596,676 B2 * | 12/2013 | Nagasawa ............... B62D 1/16 280/731 |
| 8,899,623 B2 | 12/2014 | Stadler et al. |
| 2002/0089160 A1 | 7/2002 | Mendis |
| 2002/0135163 A1 | 9/2002 | Derrick |
| 2013/0038044 A1 | 2/2013 | Nagasawa et al. |
| 2013/0062866 A1 | 3/2013 | Breed |
| 2013/0249252 A1 | 9/2013 | Schmid et al. |
| 2014/0028007 A1 | 1/2014 | Pfeiffer et al. |

FOREIGN PATENT DOCUMENTS

| | | |
|---|---|---|
| DE | 103 16 543 | 11/2003 |
| DE | 602 00 754 | 7/2005 |
| DE | 102004004710 | 8/2005 |
| DE | 601 19 272 | 5/2007 |
| DE | 199 04 321 | 1/2010 |
| DE | 112011101891 | 5/2013 |
| DE | 102012017680 | 3/2014 |
| EP | 1 225 099 | 7/2002 |
| EP | 2 857 283 | 4/2015 |
| JP | 2005 112130 | 4/2005 |

OTHER PUBLICATIONS

Translation of European Search Report issued on Aug. 12, 2015 with respect to counterpart Chinese patent application EP 15 00 0549.

* cited by examiner

OCCUPANT PROTECTION DEVICE FOR A VEHICLE

CROSS-REFERENCES TO RELATED APPLICATIONS

This application claims the priority of German Patent Application, Serial No. 10 2014 004 570.6, filed Mar. 28, 2014, pursuant to 35 U.S.C. 119(a)-(d), the disclosure of which is incorporated herein by reference in its entirety as if fully set forth herein.

BACKGROUND OF THE INVENTION

The present invention relates to an occupant protection device for a vehicle, and to a method for protecting an occupant of a vehicle.

The following discussion of related art is provided to assist the reader in understanding the advantages of the invention, and is not to be construed as an admission that this related art is prior art to this invention.

An occupant protection device normally includes an airbag which is integrated in the steering wheel and is activated in the event of a crash to support the driver when shifting forwards. The airbag may be part of an airbag module which is arranged in the hub region of the steering wheel. When deployed, the airbag can have asymmetric configuration to conform to a body shape of the driver. For example, the airbag can have a head portion for head impact and a thorax portion for thorax impact. Such an airbag is only effective in terms of providing an adequate support function in the event of a crash, when the airbag portions coincide with the position of the corresponding body regions of the driver. This is the case only when the steering wheel is positioned for straight-ahead travel of the vehicle.

It would therefore be desirable and advantageous to provide an improved occupant protection device which obviates prior art shortcomings and is simple in structure while still providing a proper alignment of an airbag, regardless of an actual position of the steering wheel to set a steering angle for vehicle wheels.

SUMMARY OF THE INVENTION

According to one aspect of the present invention, an occupant protection device for a vehicle includes an airbag module arranged in a hub region of a vehicle steering wheel used for steering vehicle wheels about a steering angle when the steering wheel is turned to a rotary position, the airbag module having an airbag configured for deployment between a driver and the steering wheel in the event of a crash, and an adjustment unit configured to turn the steering wheel from the rotary position to a crash position while the steering angle of the vehicle wheels remains unchanged so as to align the airbag with a posture of the driver in the event of a crash.

The present invention resolves prior art problems by providing an adjustment unit which causes a rotation of the steering wheel into a crash position, while maintaining the steering angle of the steered vehicle wheel, so that the airbag assumes its optimal position in relation to the position of the driver. In other words, the steering wheel is turned for a brief period into a predefined rotary position which corresponds to the crash position. Rotation of the steering wheel is hereby realized without influencing the steering function. In this way, the airbag is always positioned to effect an optimal support function in the event of a crash, while still realizing an occupant protection device which is simple in structure.

For example, in the event of a crash, the steering wheel is turned into a straight-ahead travel orientation within a defined time range shortly before and after the crash moment. Only the steering wheel is hereby turned and there is no intervention in the steering of the vehicle wheels.

According to another advantageous feature of the present invention, the adjustment unit and the steering wheel can be components of a steer-by-wire steering system which includes a steering sensor issuing a steering command in response to the rotary position and/or rotary actuation of the steering wheel, an actuator operably connected to the vehicle wheels, and a controller electrically connected to the actuator and activating the actuator in response to the steering command received from the steering sensor for setting the steering angle of the steered vehicle wheels, as desired by the driver. In the steer-by-wire steering system, the adjustment unit can be configured to allow execution of a force/path control of the steering wheel for providing a haptic feedback to the driver. In other words, the adjustment unit can be configured to provide during normal travel the haptic feedback while adjusting the steering wheel to assume the crash position in the event of a crash.

It is, optionally, also possible to implement the turning of the steering wheel into the crash position by using an additional driving mechanism, such as a spring element or the like. As described above, a steering sensor is associated to the steer-by-wire steering system. As an alternative, the steering wheel position may also be sensed by the adjustment unit itself, depending on its configuration. The controller includes a processor to coordinate the required turning operation of the steering wheel to the crash position in which the airbag in the steering wheel is optimally aligned in relation to the driver.

According to another advantageous feature of the present invention, the airbag may have an asymmetric configuration, when being deployed. Advantageously, the airbag can have a thorax portion and a head portion.

According to another advantageous feature of the present invention, the airbag module together with the airbag can be rotatably coupled with the steering wheel.

According to another advantageous feature of the present invention, the crash position of the steering wheel can be identical to a straight-ahead travel position of the vehicle so that the adjustment unit adjusts the steering wheel from the rotary position to the straight-ahead travel position in the event of a crash while the steering angle of the vehicle wheels remains unchanged.

According to another advantageous feature of the present invention, a sensor element may be operably connected to the controller and configured to ascertain an actual posture of the driver. The controller determines the crash position of the steering wheel so that a rotation angle position of the steering wheel is adjustable in dependence of the actual posture of the driver, when the actual posture of the driver is out-of-position. Thus, the controller establishes in dependence on the ascertained actual driver position the steering wheel crash position which, for example, may deviate from the straight-ahead travel position. For example, when the controller receives information for an out-of-position situation of the driver, the crash position can be set such that the airbag is aligned with respect to the out-of-position of the driver. An example of such an out-of-position involves a shift of the driver's torso towards the center console. The term "out-of-position" of the driver's posture relates within the scope of the invention to a situation in which a vehicle occupant does not assume a normal position and thus a position that deviates therefrom.

According to another advantageous feature of the present invention, a pre-crash sensor mechanism may be operably connected via a signal link to the controller and configured to generate a pre-crash signal by which the adjustment unit is activated via the controller to execute an adjustment operation to move the steering wheel to the crash position. After executing this adjustment operation, the airbag is activated, i.e. triggered and deployed. Advantageously, the adjustment unit can be configured to lock the steering wheel during activation of the airbag to further enhance driver safety. In other words, the steering wheel cannot be turned when the airbag is deployed and the driver plunges into the airbag. As described above, adjustment of the steering wheel and activation of the airbag occur in the pre-crash phase that precedes the crash moment. Advantageously, the adjustment operation and activation of the airbag can be executed without any overlap in time. In other words, the airbag activation immediately follows the adjustment operation.

According to another advantageous feature of the present invention, a sensor element can be operably connected to the controller and configured to determine the presence of a steering wheel intervention by the driver, when the adjustment unit has executed the adjustment operation of the steering wheel. Advantageously, the adjustment unit can be configured to abort the adjustment operation in the presence of a steering wheel intervention by the driver. This further enhances driver safety in the event of a crash. The sensor element can be, for example, a camera or a humidity sensor to ascertain a contact of the driver with the steering wheel. As an alternative, the sensor element may also be configured as a force measuring device configured to determine a resistance force upon the steering wheel during the adjustment operation. A combination of camera or a humidity sensor with force measuring device is, of course, also conceivable.

According to another aspect of the present invention, a method for protecting an occupant in a vehicle includes arranging an airbag module in a hub region of a vehicle steering wheel used for steering vehicle wheels about a steering angle when the steering wheel is turned to a rotary position, and controlling the steering wheel by an adjustment unit to align an airbag of the airbag module with a posture of a driver of the vehicle in the event of a crash by turning the steering wheel from the rotary position to a crash position in the absence of a change to the steering angle of the vehicle wheels.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
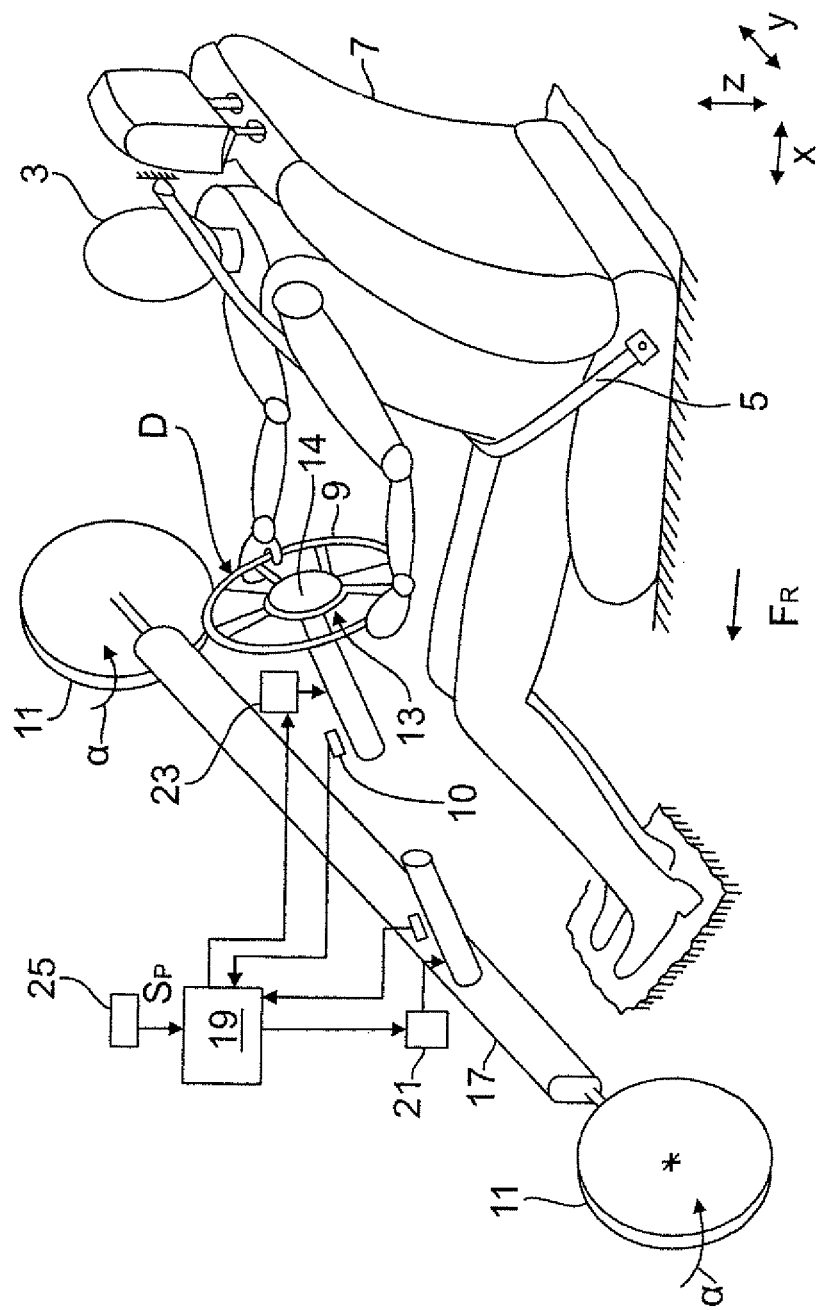
FIG. 1 is a basic representation of a test setup for simulation of a vehicle crash with illustration of a block diagram showing components of an occupant protection device according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a roughly simplified basic representation of a test setup for simulation of a vehicle crash with illustration of a block diagram showing components of an occupant protection device according to the present invention. FIG. 1 shows only components that are necessary for the understanding of the invention. A dummy 3 simulating a driver, is positioned in a driver seat in a vehicle interior 1 of the vehicle, not shown in greater detail, and buckled up by a safety belt 5. The dummy 3 is shown in a position holding a steering vehicle 9 of the vehicle. FIG. 1 simulates a travel situation in which the vehicle moves in travel direction $F_R$ and the driver 3 turns the steering wheel 9 to a rotary position D to thereby turn the vehicle wheels 11 to the left about a steering angle $\alpha$.

A steering wheel airbag module is integrated in a hub region 13 of the steering wheel 9 and includes an airbag 15 (FIGS. 3 and 5) which is covered by an airbag cover 14 during normal operation and deployed between the driver 3 and the steering wheel 9 in the event of a crash. The airbag module together with the airbag 15 is installed in the steering wheel 9 so as to be rotatably coupled with the steering wheel 9.

In the non-limiting example shown in the drawings, the steering wheel 9 is part of a steer-by-wire steering system which replaces a mechanical connection between the steering wheel 9 and a steering gear 17, linked to the vehicle wheels 11, and includes a complete electronic force and path control system for the steering wheel 9 and the steered vehicle wheels 11. In the steer-by-wire steering system, steering commands of the driver are processed in a controller 19 which electrically activates an electromechanical actuator 21 as a function of the steering commands. Although not shown in detail, the actuator 21 is in driving relationship with the steering gear 17 to adjust the steering angle $\alpha$ of the steered vehicle wheels 11, as desired by the driver 3. The controller 19 is operably connected to a steering sensor 10 which registers the rotary position D (and/or a rotary actuation to the rotary position D) of the steering wheel 9 as a steering command. The actuator 21 is activated in dependence on the ascertained steering command. Operably connected to the controller 19 is also an adjustment unit 23 by which a force/path control of the steering wheel 9 can be executed. The adjustment unit 23 provides the driver 3 via the steering wheel 9 a haptic feedback about the steering operation for example.

Figure 2:
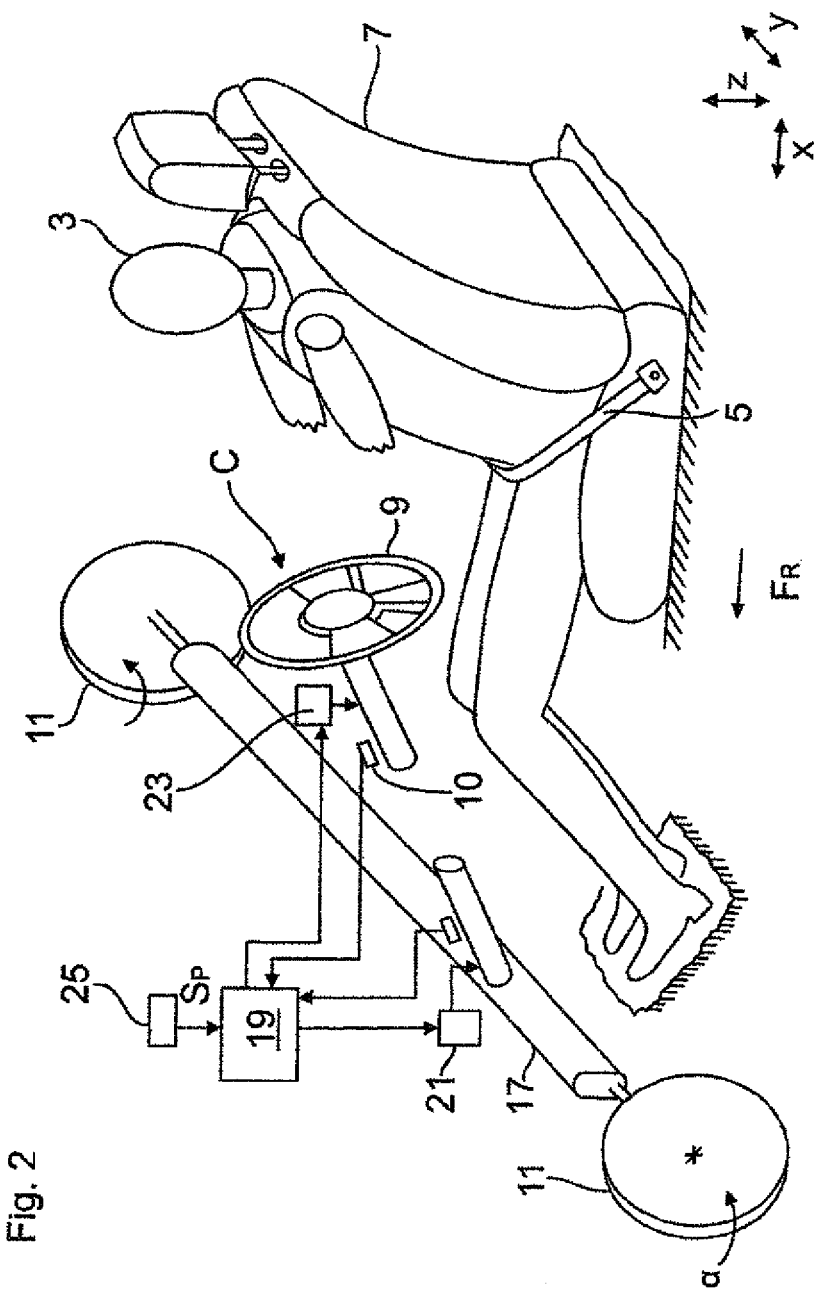
FIG. 2 is a basic representation of the test setup of FIG. 1 during a pre-crash phase at a time of a steering wheel adjustment operation.
Figure 3:
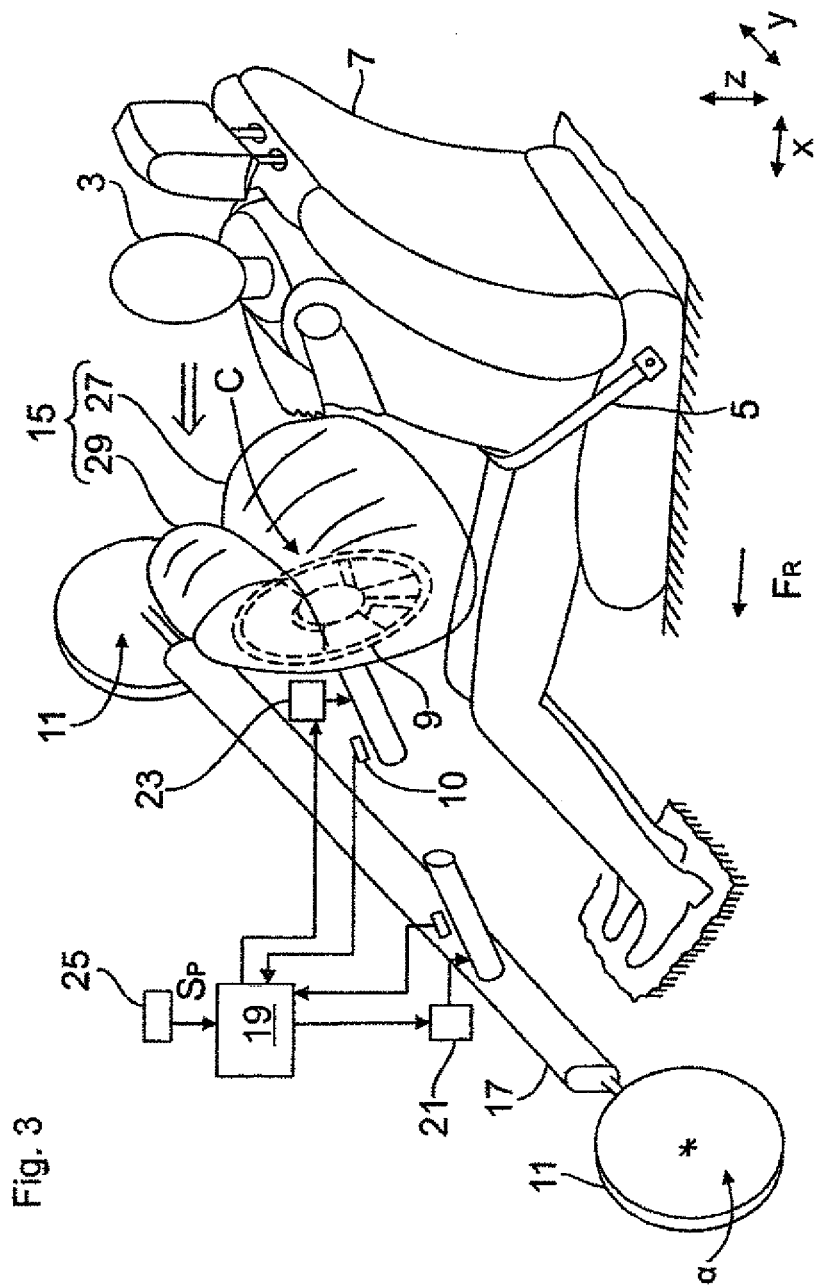
FIG. 3 is a basic representation of the test setup of FIG. 1 during the pre-crash phase at a time of airbag deployment.
Figure 4:
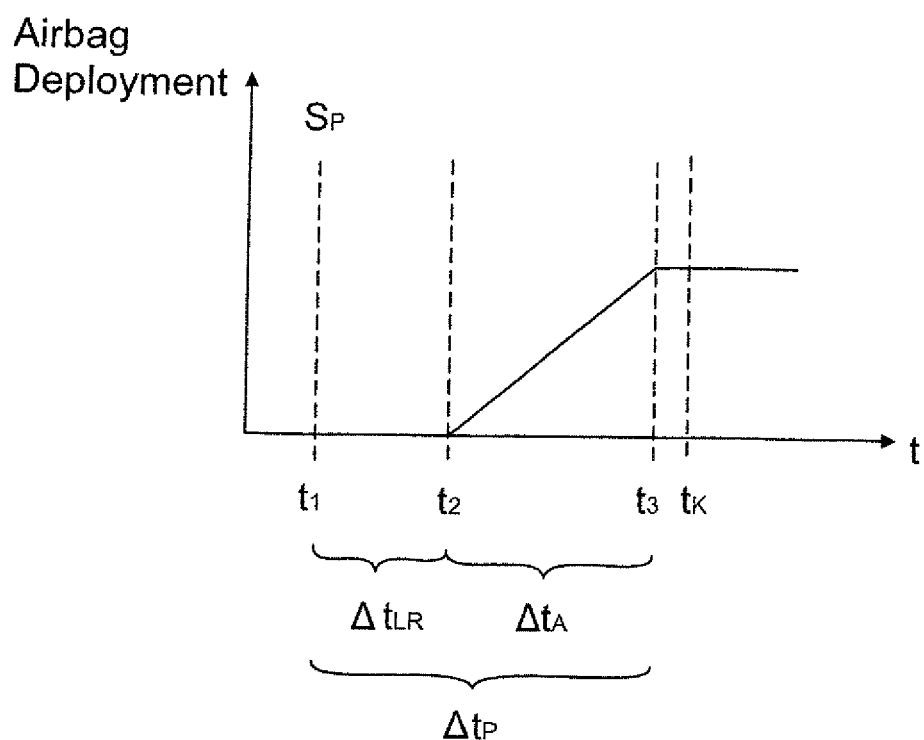
FIG. 4 is a graphical illustration of a time diagram to illustrate an exemplary pre-crash phase by depicting the relation of airbag deployment as a function of time.

Referring now to FIG. 4, there is shown a graphical illustration of a time diagram to illustrate the mode of operation of the occupant protection device during an exemplary pre-crash phase $\Delta t_P$ with reference to FIGS. 1 to 4. As is readily apparent from FIG. 4, the pre-crash phase $\Delta t_P$ is split into a steering wheel adjustment operation $\Delta t_{LR}$ and a following airbag activation $\Delta t_A$, which are executed without any overlap in time. The steering wheel adjustment operation $\Delta t_{LR}$ commences at a time instance $t_1$, when a pre-crash sensor mechanism 25 generates a pre-crash signal $S_P$ which is transmitted to the controller 19. As a result, the adjustment unit 23 is activated such that the steering wheel 9 is moved from the actual rotary position D (FIG. 1) into a crash situation C in which the airbag 15 is properly or optimally aligned with the driver's posture. FIG. 1 shows by way of example that the steering wheel 9 is turned left into the rotary position D so that the steered vehicle wheels 11 are turned to the left by the steering angle α. In contrast thereto, FIG. 2 shows the pre-crash phase $\Delta t_P$ at time instance $t_2$ in which the steering wheel 9 has assumed already its crash position C. The crash position C may, for example, hereby coincide with a straight-ahead travel position of the steering wheel 9 of the vehicle. The steered vehicle wheels 11 still retain, however, their position in which the vehicle wheels 11 are turned to the left about the unchanged steering angle α. In other words, the adjustment operation $\Delta t_{LR}$ of the steering wheel 9 has no impact on the position of the vehicle wheels 11, even though the steering wheel 9 has been turned.

Once the adjustment operation $\Delta t_{LR}$ of the steering wheel 9 has concluded, an airbag activation $\Delta t_A$ is executed at time instance $t_2$ to trigger and deploy the airbag 15. FIG. 3 shows the airbag 15 in its fully deployed state, i.e. at a time instance $t_3$ immediately before the collision time instance $t_K$. As is also readily apparent from FIG. 3, the airbag 15 has an asymmetric configuration with a lower thorax portion 27 and an upper head portion 29 for head impact of the driver 3, as viewed in vertical vehicle direction z. During airbag activation $\Delta t_A$, the adjustment unit 23 locks any rotary actuation of the steering wheel 9 so that the steering wheel 9 reliably retains its crash position C.

FIGS. 2 and 3 shows the crash position C of the steering wheel 9 as coinciding with a straight-ahead travel position of the steering wheel 9 to ensure an optimum alignment of the airbag 15 with a normal posture of the driver 3.

Figure 5:
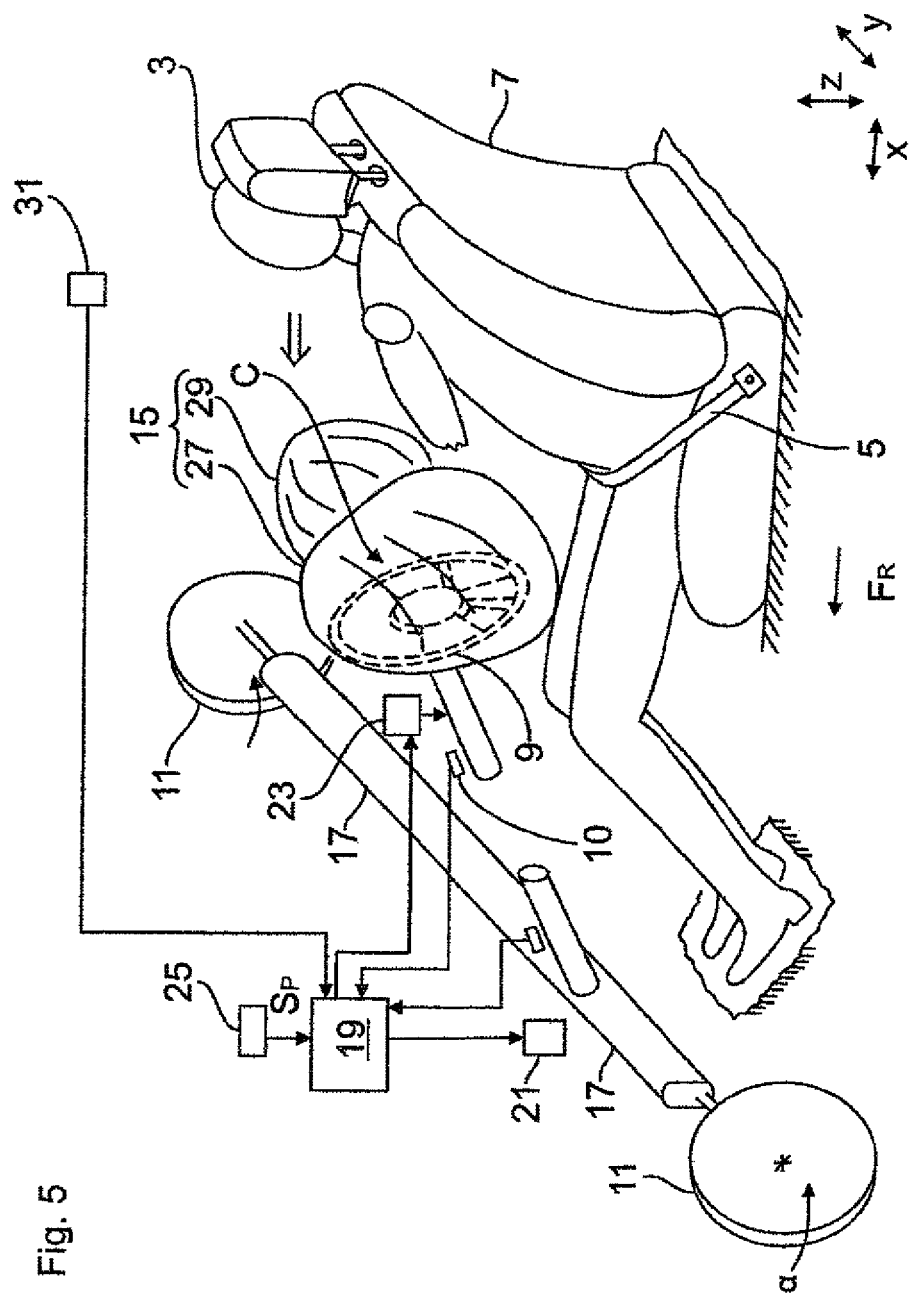
FIG. 5 is a basic representation, similar to FIG. 3, of a modified occupant protection device according to the present invention during a pre-crash phase at a time instance of airbag deployment.

Turning now to FIG. 5, there is shown a basic representation of a modified occupant protection device according to the present invention during a pre-crash phase at a time instance of airbag deployment. Parts corresponding with those in FIGS. 1-3 are denoted by identical reference numerals and not explained again. The description below will center on the differences between the embodiments. In this embodiment, the crash position C of the steering wheel 9 does not coincide with a straight-ahead travel position of the steering wheel 9, but rather the crash position C is suited to an actual posture of a driver 3. For this purpose, the controller 19 includes an additional sensor element 31, e.g. a camera or humidity sensor, which ascertains an actual driver position of the driver 3. By way of example, the driver 3 is shown in FIG. 5 to assume a so-called out-of-position posture in which the driver's torso leans towards a center console. The sensor element 31 detects this driver position and transmits a corresponding positioning signal to the controller 19 which determines an optimum crash position C in dependence of the detected driver position. This is followed by the adjustment operation $\Delta t_{LR}$ of the steering wheel 9, whereby the head portion 29 of the airbag 15 is no longer in alignment above the thorax portion 27, as viewed in vertical vehicle direction z, but rather inclined in a direction of the vehicle interior in correspondence with the driver's torso.

The adjustment unit 23 may also include a force measuring device to detect a resistance force applied during the adjustment operation $\Delta t_{LR}$ upon the steering wheel 9. When the resistance force exceeds a predefined threshold value, it is possible to abort the adjustment operation $\Delta t_{LR}$ so as to prevent interference with the driver 3.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An occupant protection device for a vehicle, comprising:
    an airbag module arranged in a hub region of a vehicle steering wheel used for steering vehicle wheels about a steering angle when the steering wheel is turned to a rotary position, said airbag module having an airbag configured for deployment between a driver and the steering wheel in the event of a crash; and
    an adjustment unit configured to turn the steering wheel from the rotary position to a crash position while the steering angle of the vehicle wheels remains unchanged so as to align the airbag with a posture of the driver in the event of a crash, wherein the steering wheel is a component of a steer-by-wire steering system which includes a steering sensor issuing a steering command in response to the rotary position and/or rotary actuation of the steering wheel, an actuator operably connected to the vehicle wheels, and a controller electrically connected to the actuator and activating the actuator in response to the steering command received from the steering sensor for setting the steering angle of the vehicle wheels; and
    a sensor element operably connected to the controller and configured to ascertain an actual posture of the driver, said controller configured to determine the crash position of the steering wheel so that a rotation angle position of the steering wheel is adjustable in dependence of the actual posture of the driver, when the actual posture of the driver is out-of-position.

2. The occupant protection device of claim 1, wherein the adjustment unit is configured to allow execution of a force/path control of the steering wheel for providing a haptic feedback to the driver.

3. The occupant protection device of claim 1, wherein the airbag has an asymmetric configuration, when being deployed.

4. The occupant protection device of claim 3, wherein the airbag has a thorax portion and a head portion.

5. The occupant protection device of claim 1, wherein the airbag module together with the airbag is rotatably coupled with the steering wheel.

6. The occupant protection device of claim 1, wherein the crash position of the steering wheel is identical with a straight-ahead travel position of the vehicle so that the adjustment unit adjusts the steering wheel from the rotary position to the straight-ahead travel position in the event of a crash while the steering angle of the vehicle wheels remains unchanged.

7. The occupant protection device of claim 1, further comprising a pre-crash sensor mechanism operably connected to the controller and configured to generate a pre-crash signal by which the adjustment unit is activated by the controller to execute an adjustment operation to move the steering wheel to the crash position.

8. The occupant protection device of claim 7, wherein the airbag is activated after the adjustment unit has executed the adjustment operation of the steering wheel.

9. The occupant protection device of claim 8, wherein the adjustment operation and the activation of the airbag are executed without any overlap in time.

10. The occupant protection device of claim 8, wherein the adjustment unit is configured to lock the steering wheel in the crash position during activation of the airbag.

11. The occupant protection device of claim 7, further comprising a sensor element operably connected to the controller and configured to determine the presence of a steering wheel intervention by the driver, when the adjustment unit has executed the adjustment operation of the steering wheel.

12. The occupant protection device of claim 11, wherein the adjustment unit is configured to abort the adjustment operation in the presence of a steering wheel intervention by the driver.

13. The occupant protection device of claim 11, wherein the sensor element is a camera or a humidity sensor to ascertain a contact of the driver with the steering wheel.

14. The occupant protection device of claim 11, wherein the sensor element is a force measuring device configured to determine a resistance force upon the steering wheel during the adjustment operation.

15. A method for protecting an occupant in a vehicle, comprising:
arranging an airbag module in a hub region of a vehicle steering wheel used for steering vehicle wheels about a steering angle, when the steering wheel is turned to a rotary position;
controlling the steering wheel by an adjustment unit to align an airbag of the airbag module with a posture of a driver of the vehicle in the event of a crash by turning the steering wheel from the rotary position to a crash position in the absence of a change to the steering angle of the vehicle wheels, wherein the steering wheel is a component of a steer-by-wire steering system which includes a steering sensor issuing a steering command in response to the rotary position and/or rotary actuation of the steering wheel, an actuator operably connected to the vehicle wheels, and a controller electrically connected to the actuator and activating the actuator in response to the steering command received from the steering sensor for setting the steering angle of the vehicle wheels;
operably connecting a sensor element to the controller to ascertain an actual posture of the driver;
determining the crash position of the steering wheel by the controller; and
adjusting a rotation angle position of the steering wheel in dependence of the actual posture of the driver, when the actual posture of the driver is out-of-position.

16. The method of claim 15, wherein the adjustment unit is configured to allow execution of a force/path control of the steering wheel for providing a haptic feedback to the driver.

17. The method of claim 15, further comprising rotatably coupling the airbag module together with the airbag with the steering wheel.

18. The method of claim 15, wherein the crash position of the steering wheel is identical with a straight-ahead travel position so as to adjust the steering wheel from the rotary position to the straight-ahead travel position in the event of a crash while the steering angle of the vehicle wheels remains unchanged.

19. The method of claim 15, further comprising operably connecting a pre-crash sensor mechanism to the controller to generate a pre-crash signal by which the adjustment unit is activated by the controller to execute an adjustment operation to move the steering wheel to the crash position.

20. The method of claim 19, further comprising activating the airbag after the adjustment unit has executed the adjustment operation of the steering wheel.

21. The method of claim 20, further comprising executing the adjustment operation and activation of the airbag without any overlap in time.

22. The method of claim 19, wherein the adjustment unit is configured to lock the steering wheel during activation of the airbag.

23. The method of claim 19, further comprising operably connecting a sensor element to the controller to determine the presence of a steering wheel intervention by the driver, when the adjustment unit has executed the adjustment operation of the steering wheel.

24. The occupant protection device of claim 19, wherein the adjustment unit is configured to abort the adjustment operation in the presence of a steering wheel intervention by the driver.

25. The method of claim 23, wherein the sensor element is a camera or a humidity sensor to ascertain a contact of the driver with the steering wheel.

26. The method of claim 23, wherein the sensor element is a force measuring device configured to determine a resistance force upon the steering wheel during the adjustment operation.

* * * * *